US012650124B2

(12) United States Patent
Schramm et al.

(10) Patent No.: US 12,650,124 B2
(45) Date of Patent: Jun. 9, 2026

(54) SYSTEMS AND METHODS OF SEALING FLUIDS AT ECCENTRIC TEMPERATURES IN STATIC AND DYNAMIC ENVIRONMENTS

(71) Applicant: Shape Technologies Group, Inc., Kent, WA (US)

(72) Inventors: Sean R. Schramm, Buckley, WA (US); Jordan J. Hopkins, Kenmore, WA (US); Mohamed A. Hashish, Bellevue, WA (US); Ethan E. Romanoff, Bonney Lake, WA (US)

(73) Assignee: Shape Technologies Group, Inc., Kent, WA (US)

( * ) Notice: Subject to any disclaimer, the term of this patent is extended or adjusted under 35 U.S.C. 154(b) by 131 days.

(21) Appl. No.: 18/649,852

(22) Filed: Apr. 29, 2024

(65) Prior Publication Data

US 2025/0334114 A1 Oct. 30, 2025

(51) Int. Cl.
*F17C 5/06* (2006.01)
*F04B 53/02* (2006.01)
*F04B 53/16* (2006.01)

(52) U.S. Cl.
CPC ............ *F04B 53/02* (2013.01); *F04B 53/162* (2013.01); *F17C 5/06* (2013.01)

(58) Field of Classification Search
CPC ......... F04B 53/02; F04B 53/162; F16J 13/02; F16J 13/16; F15B 15/1438; F15B 15/1442; F17C 5/02; F17C 5/04; F17C 5/06; F17C 6/00
See application file for complete search history.

(56) References Cited

U.S. PATENT DOCUMENTS

| | | | |
|---|---|---|---|
| 2,321,927 | A | 6/1943 | Mccoy et al. |
| 3,429,581 | A | 2/1969 | Himmel |
| 3,877,113 | A | 4/1975 | Reyes |
| 4,181,332 | A | 1/1980 | Neumann |
| 4,239,244 | A | 12/1980 | Brent |

(Continued)

FOREIGN PATENT DOCUMENTS

| | | | |
|---|---|---|---|
| CN | 115306505 | A | 11/2022 |
| DE | 801602 | C | 1/1951 |

(Continued)

OTHER PUBLICATIONS

PCT Written Opinion of the International Searching Authority, PCT/U2025/026492. Issued Aug. 13, 2025.

*Primary Examiner* — Michael Leslie
(74) *Attorney, Agent, or Firm* — Cozen O'Connor

(57) ABSTRACT

Disclosed herein are components, systems, and methods for sealing and pressurizing fluids at eccentric temperatures. Embodiments of a high-pressure system include static seals, dynamic seals, or both. A fluid tight seal formed between abutting surfaces of stationary, adjacent components is movable, via rolling contact between the abutting surfaces, as a temperature of the adjacent components enters the eccentric temperature range. The materials of the adjacent components may be selected based on their thermal expansion and contraction characteristics, and respective geometries of components of the high-pressure system may be selected to maintain a minimal gap between moving, adjacent components of the high-pressure system.

19 Claims, 8 Drawing Sheets

(56) References Cited

U.S. PATENT DOCUMENTS

| | | | |
|---|---|---|---|
| D258,508 | S | 3/1981 | Serrambana |
| 4,540,205 | A | 9/1985 | Watanabe et al. |
| 4,817,962 | A | 4/1989 | Mott et al. |
| 5,002,316 | A | 3/1991 | Chohan |
| 5,007,276 | A | 4/1991 | Kadis et al. |
| 5,120,084 | A | 6/1992 | Hashimoto |
| 5,143,410 | A | 9/1992 | Takikawa |
| 5,172,939 | A | 12/1992 | Hashimoto |
| 5,350,200 | A | 9/1994 | Peterson et al. |
| 5,489,127 | A | 2/1996 | Anglin et al. |
| 5,493,954 | A | 2/1996 | Kostohris et al. |
| 5,588,680 | A | 12/1996 | Cassel et al. |
| 5,667,255 | A | 9/1997 | Kato |
| 5,725,259 | A | 3/1998 | Dials |
| D423,087 | S | 4/2000 | Houseman |
| 6,045,162 | A | 4/2000 | Haibara |
| 6,045,165 | A | 4/2000 | Sugino et al. |
| 6,086,070 | A | 7/2000 | Tremoulet et al. |
| D435,090 | S | 12/2000 | Stout |
| 6,162,031 | A | 12/2000 | Tremoulet |
| D436,157 | S | 1/2001 | Houseman |
| 6,241,492 | B1 | 6/2001 | Pacht |
| 6,279,965 | B1 | 8/2001 | Kida |
| 6,305,693 | B1 | 10/2001 | Wehrle |
| 6,312,022 | B1 | 11/2001 | Brophy et al. |
| D465,061 | S | 10/2002 | Guthrie |
| D485,889 | S | 1/2004 | Dubois |
| D490,819 | S | 6/2004 | Wahlberg |
| 6,802,541 | B2 | 10/2004 | Hopkins et al. |
| D497,977 | S | 11/2004 | Engelbrektsson |
| D518,559 | S | 4/2006 | Oestergaard et al. |
| D530,400 | S | 10/2006 | Oestergaard et al. |
| 7,247,006 | B2 | 7/2007 | Hopkins et al. |
| D561,877 | S | 2/2008 | Hopkins et al. |
| 7,367,789 | B2 * | 5/2008 | Raghavan ............. F04B 53/007 417/571 |
| 7,568,424 | B2 | 8/2009 | Hopkins et al. |
| 8,671,997 | B2 * | 3/2014 | Allidieres ............. F17C 13/026 141/82 |
| 2003/0197377 | A1 | 10/2003 | Hopkins et al. |

FOREIGN PATENT DOCUMENTS

| | | | |
|---|---|---|---|
| GB | 1344894 | A | 1/1974 |
| GB | 1397493 | A | 6/1975 |
| GB | 2022726 | A | 12/1979 |
| JP | 2010180890 | A | 8/2010 |
| WO | 9846881 | A2 | 10/1998 |
| WO | 9914500 | A1 | 3/1999 |
| WO | 03060357 | A1 | 7/2003 |
| WO | 2004097221 | A1 | 11/2004 |
| WO | 2008061093 | A1 | 5/2008 |
| WO | 2013109474 | A1 | 7/2013 |

* cited by examiner

SYSTEMS AND METHODS OF SEALING FLUIDS AT ECCENTRIC TEMPERATURES IN STATIC AND DYNAMIC ENVIRONMENTS

BACKGROUND

Technical Field

The present disclosure relates to eccentric temperature fluid containment systems, in general, and more specifically to systems and methods of sealing fluids at eccentric temperatures within high-pressure fluid containment systems.

Description of the Related Art

Systems that contain fluids at high pressures, such as those in excess of 15,000 psi, can be extremely complex and subject to failure after an unacceptably short life span. One example of a known high-pressure system is illustrated in FIGS. 1 to 3. As shown in FIG. 1, a cylinder 10 is compressed by tie-rods 12 between a check valve 14 and a plug 16. A fluid is pressurized to a high pressure within a cavity 18 of the cylinder 10. The cavity 18 is sealed at both ends, with a static seal formed between the cylinder 10 and the check valve 14 (as shown in FIG. 2) and a dynamic seal formed between the cylinder 10 and the plug 16 (as shown in FIG. 3).

The known system includes an annular seal 20 fabricated from a sacrificial material of lower strength than the cylinder 10 and the check valve 14. The annular seal 20 is positioned between the cylinder 10 and the check valve 14 to provide a seal that prevents the fluid in the cavity 18 from escaping along a path that passes between the cylinder 10 and the check valve 14. It has been found, however, that the lower strength seal 20 requires frequent replacement, and that the stresses exerted by the seal result in early failure of the components of the known system. Such failures include cracks 22 formed in the bodies adjacent the annular seal 20.

In addition, because materials subjected to extremely high pressures expand, relative motion between the parts results in failure through spalling, galling, or fretting. As the pressure within the cylinder 10 cycles between atmospheric pressure and high pressures, the cylinder 10 and the plug 16 expand and contract at different rates. As a result, during each pressure cycle there is relative movement of the cylinder 10 and the plug 16. Relative movement between abutting components of like materials results in spalling, galling, and fretting, each of which can damage one or both of the abutting components and shorten the life of the known system.

Another challenge faced by known high-pressure fluid systems is forming and maintaining seals to contain high or low-temperature fluids, such as those outside of the range of 40° F. to 60° F. The components of known systems (e.g., vessels and pumps) expand and contract when thermally cycled (e.g., via proximity to the high or low-temperature fluid and/or via the pressurization operation) resulting in alteration of the sealing configuration, which was designed for use at a certain (e.g., room temperature) temperature range. This expansion and alternation of the sealing configuration applies to both static seals (formed between components that do not move relative to one another) and dynamic seals (formed between components that move, for example linearly, relative to one another).

Eccentric temperatures (e.g., extreme and/or unconventional temperatures) are known to negatively impact the performance of high-pressure fluid systems. Some known systems include a polymeric seal that is used to seal a gap between moving components. For example, at elevated temperatures these polymeric seals become softer, which results in their extrusion into the gap between the moving components. This extrusion of the polymeric seal occurs rapidly and repeatedly during operation of the known system, resulting in a reduction in expected operational lifetime of the polymeric seal due to mechanical failure.

Known systems also include seals formed by direct contact between similar materials (e.g., a metal-to-metal seal) that lacks any sacrificial or intermediate material between the adjacent components. Eccentric temperatures are also known to negatively affect these direct contact seals. The abutting components expand and contract at different rates relative to one another (e.g., due to materials with different coefficients of thermal expansion, different material thickness, and/or different shapes). The relative motion causes wear on the abutting components and failure of the sealing interface.

Although the illustrated example is a cylinder between a plug and a check valve, it has been experienced in the industry that similar failures occur at other locations throughout a high-pressure fluid containment system. Accordingly, systems and methods of sealing fluids at eccentric temperatures are described herein directed to solving such problems throughout the system.

BRIEF SUMMARY

Embodiments described herein provide systems and methods of sealing high-pressure fluids at eccentric temperatures. Additional embodiments described herein include components of a high-pressure fluid containment system, and methods of assembly and operation of said systems.

According to one embodiment, a method of pressurizing a fluid at an eccentric temperature includes changing a temperature of the fluid to an eccentric temperature within a range of between −350° F. and 32° F. or between 90° F. and 1,000° F. The method further includes transferring the fluid, while maintaining the fluid at the eccentric temperature, into a pressure chamber of a pressure vessel. The fluid is then pressurized within the pressure chamber, while the fluid is maintained at the eccentric temperature, to a high pressure of between 15,000 psi and 200,000 psi. According to the method, the fluid is then transferred out of the pressure chamber, while the fluid is maintained at the eccentric temperature and at the high pressure.

According to one embodiment, a method of operating of a high-pressure system includes abutting a pressure vessel with a first end cap, thereby forming a first fluid tight barrier at a first end of a pressure chamber that extends through the pressure vessel, and abutting the pressure vessel with a second end cap, thereby forming a second fluid tight barrier at a second end of the pressure chamber. The method further includes delivering fluid that is at an eccentric temperature of between −350° F. and 32° F. or between 90° F. and 1,000° F. into the pressure vessel, pressurizing the fluid within the pressure chamber, while maintaining the fluid within the eccentric temperature range, to a high pressure of between 15,000 psi and 200,000 psi, and transferring the fluid out of the pressure chamber, while maintaining the fluid within the eccentric temperature range and within the high pressure range.

According to one embodiment, a high-pressure system includes a pressure vessel and an end cap. The pressure vessel includes a pressure chamber extending therethrough.

The end cap is secured relative to the pressure vessel such that the end cap blocks at least a portion of an opening of the pressure chamber that is formed by the pressure vessel. A surface of the pressure vessel abuts a surface of the end cap to form a fluid tight barrier that prevents passage of fluid at a high pressure of between 15,000 psi and 200,000 psi from exiting the pressure chamber along a path that extends between the pressure vessel and the end cap. The surface of the pressure vessel is in rolling contact with the surface of the end cap such that the fluid tight barrier is movable, via the rolling contact, as a temperature of the pressure vessel enters an eccentric temperature range of between −350° F. and 32° F. or between 90° F. and 1,000° F.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements and may have been solely selected for ease of recognition in the drawings. The headings and Abstract of the Disclosure provided herein are for convenience only and do not interpret the scope or meaning of the embodiments.

DETAILED DESCRIPTION

Figure 3:
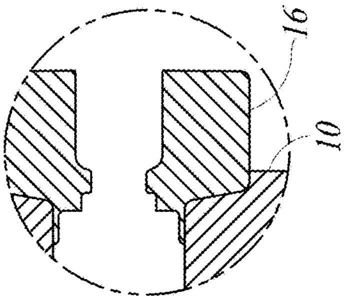
FIG. 3 (PRIOR ART)
FIG. 3 is an enlarged view of a dynamic seal of the known high-pressure system illustrated in FIG. 1.
Figure 2:
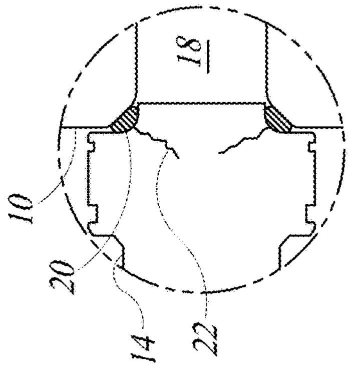
FIG. 2 (PRIOR ART)
FIG. 2 is an enlarged view of a static seal of the known high-pressure system illustrated in FIG. 1.

In the following description, certain specific details are set forth to provide a thorough understanding of various disclosed embodiments. However, one of ordinary skill in the relevant art will recognize that the disclosed embodiments may be practiced without one or more of these specific details, or with other methods, components, materials, etc. In other instances, well-known structures associated with high-pressure systems (e.g., high-pressure fluid containment systems, pumps, intensifiers, etc.) have not been shown or described in detail to avoid unnecessarily obscuring descriptions of the embodiments.

Unless the context requires otherwise, throughout the specification and claims which follow, the word “comprise” and variations thereof, such as, “comprises” and “comprising” are to be construed in an open, inclusive sense, that is as “including, but not limited to.”

Reference throughout this specification to “one embodiment” or “an embodiment” means that a particular feature, structure or characteristic described in connection with the embodiment is included in at least one embodiment. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

As used in this specification and the appended claims, the singular forms “a,” “an,” and “the” include plural referents unless the content clearly dictates otherwise. It should also be noted that the term “or” is generally employed in its broadest sense, that is as meaning “and/or” unless the content clearly dictates otherwise. Reference herein to two elements “facing” or “facing toward” each other indicates that a straight line can be drawn from one of the elements to the other of the elements without contacting an intervening solid structure.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

The headings and Abstract of the Disclosure provided herein are for convenience only and do not interpret the scope or meaning of the embodiments.

The present disclosure is directed toward components, systems and methods that form and maintain fluid tight seals for fluids at eccentric temperatures. Conventional wisdom within the field of high-pressure fluid generation and containment has long mandated that the working fluid be at room temperature. It has been demonstrated, in prior testing, that eccentric temperature fluids tend to negatively effect seals and sealing interfaces that contain the eccentric temperature fluids. In fact, this knowledge is used to accelerate testing. When testing for failure conditions of a high-pressure system, the temperature of the working fluid may be increased, which reduces the time to failure in a repeatable manner, thereby lowering the amount of time required to complete the test. These observations reinforced the paradigm that “eccentric temperature working fluids are bad for performance and expected operational lifetime of seals,” which continues to this day.

Recent exploration into pressurization and containment of eccentric temperature fluids has identified overlap and synergy between the problems and solutions for sealing high-pressure fluids and eccentric temperature fluids. Both applications are subjected to relative motion between mating/abutting components that minimize gaps between the components as the high-pressure system cycles.

Data from testing of the embodiments disclosed herein reveals improved operational lifetime for components of a seal/sealing assembly within a high-pressure system. According to one embodiment, the operational lifetime improved from approximately 30 hours (using conventional seals) to over 400 hours (using embodiments disclosed herein). These tests further revealed that the failure mode of the seals was a chemical breakdown of the materials, rather than the typical mechanical failure, which is commonly experienced in the operation of known high-pressure systems/seals.

Figure 4:
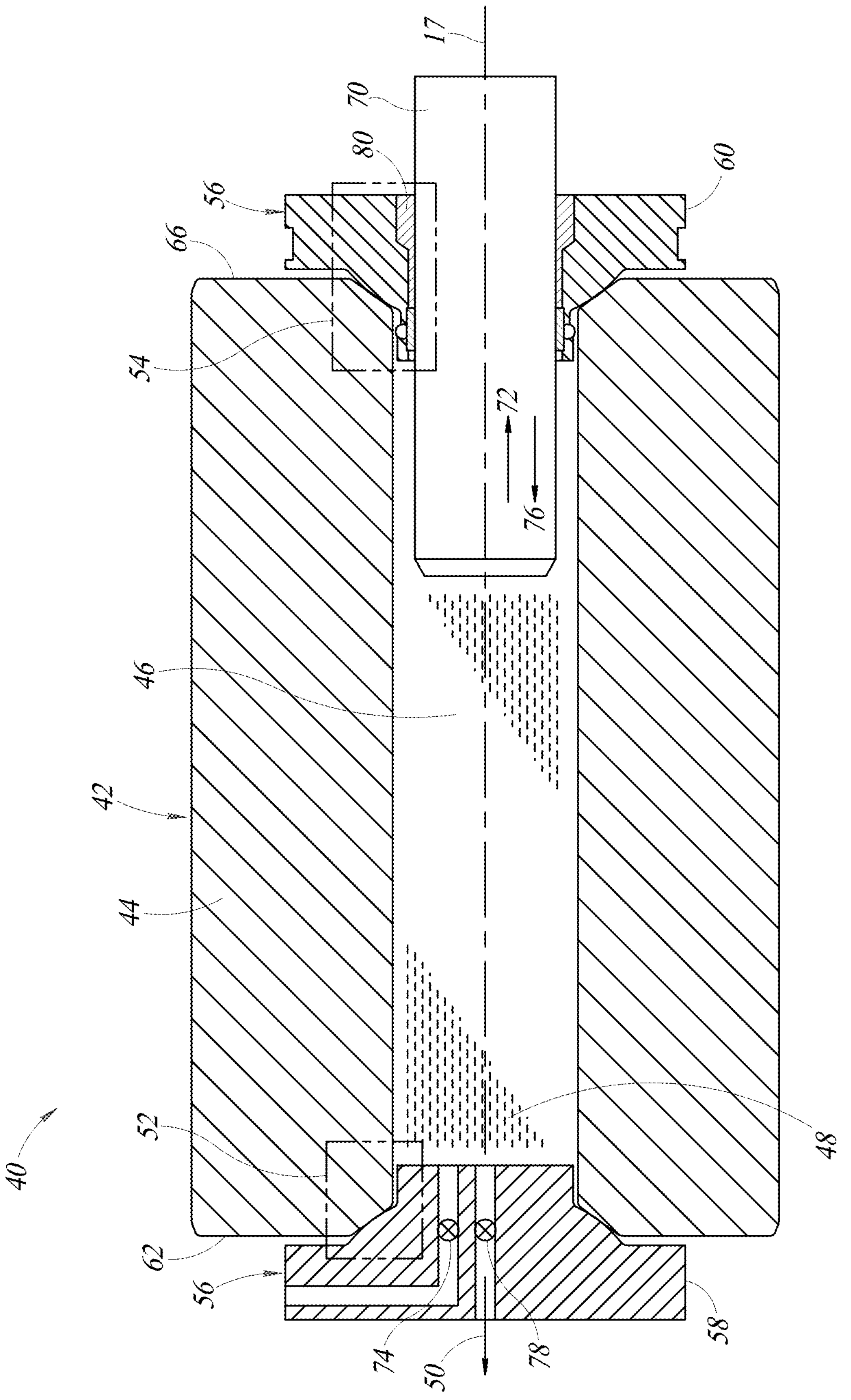
FIG. 4 is a cross-sectional side view of a high-pressure system, according to one embodiment.
Figure 5:
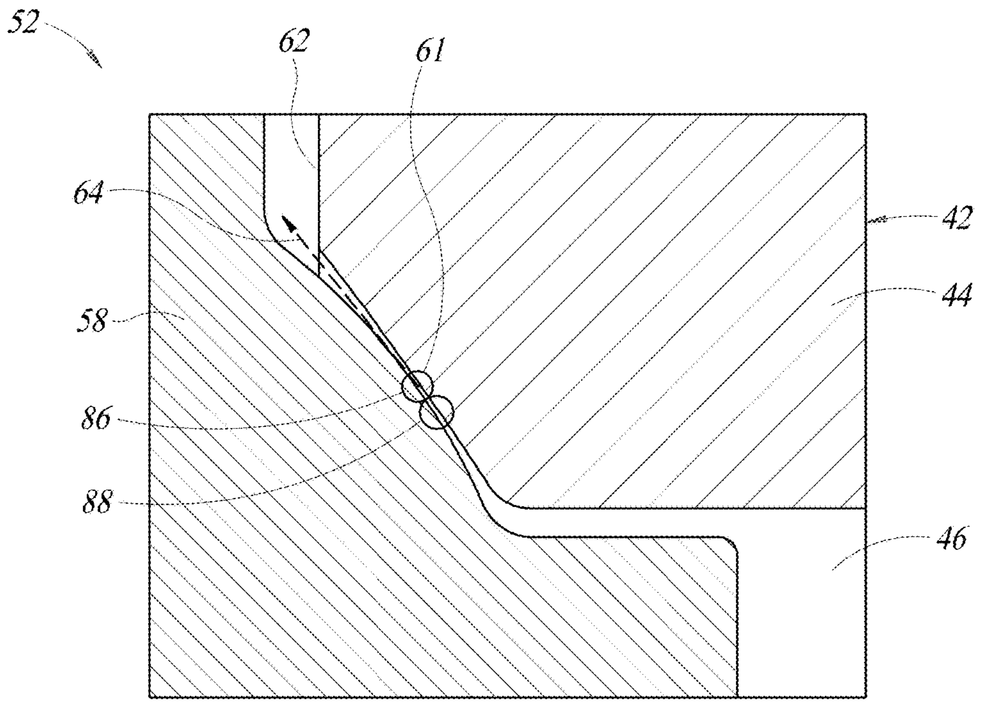
FIG. 5 is an enlarged view of a static seal of the high-pressure system illustrated in FIG. 4, according to one embodiment.
Figure 6:
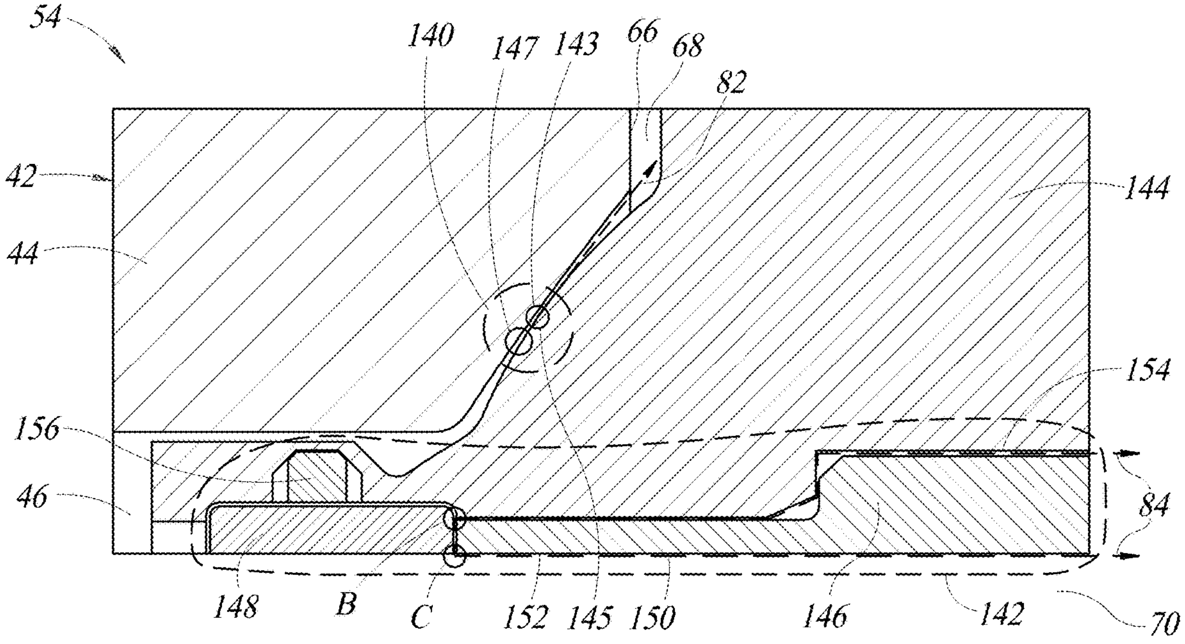
FIG. 6 is an enlarged view of a dynamic seal of the high-pressure system illustrated in FIG. 4, according to one embodiment.

Referring to FIGS. 4 to 6, a high-pressure system 40 (e.g., a fluid pump) may include a pressure vessel 42 having a vessel body 44 and a pressure chamber 46 extending therethrough (e.g., along an axis 17). The axis 17 may be an axis of elongation of the pressure vessel 42, according to one embodiment. The high-pressure system 40 may further include one or more seals that enclose the pressure chamber 46 (e.g., at either end of the vessel body 44) and prevent a fluid 48 within the pressure chamber 46 from escaping (e.g., leaking) out of the pressure chamber 46 other than along a desired flow path (e.g., along an outlet flow path 50, that may include a check valve, as described in further detail below).

The one or more seals may include at least one static seal 52 (e.g., only static seals 52). Alternatively, the one or more seals may include at least one dynamic seal 54 (e.g., only dynamic seals 54). As shown in the illustrated embodiment, the one or more seals may include a combination of static and dynamic seals 52, 54 (e.g., at least one static seal 52 and at least one dynamic seal 54).

According to one embodiment, the high-pressure system 40 may include one or more end caps 56 (e.g., a first end cap 58 and a second end cap 60) that each form a respective fluid-impermeable barrier (i.e., a fluid-tight seal 61) with the pressure vessel 42. As shown, the first end cap 58 may form a static seal 52 (e.g., at a first end 62 of the pressure vessel 42 such that the first end cap 58 blocks a first opening 64 of the pressure chamber 46 formed by the vessel body 44). The second end cap 60 may form a dynamic seal 54 (e.g., at a second end 66 of the pressure vessel 42 such that the second end cap 60 blocks a second opening 68 of the pressure chamber 46 formed by the vessel body 44).

The high-pressure system 40 may include a reciprocating plunger 70 that displaces the fluid 48 in the pressure chamber 46 (e.g., compresses and thereby pressurizes the fluid 48 in the pressure chamber 46). In use, the fluid 48 enters the pressure chamber 46 during an intake stroke of the reciprocating plunger 70. According to one embodiment, the reciprocating plunger 70 retreats from the first end cap 58 (e.g., along arrow 72) as the fluid 48 enters into the pressure chamber 46 (e.g., via a first check valve 74 of the first end cap 58).

Following the intake stroke, the reciprocating plunger 70 performs a power stroke during which the reciprocating plunger 70 approaches the first end cap 58 (e.g., along arrow 76). As the reciprocating plunger 70 approaches the first end cap 58, reducing the volume within the pressure chamber 46, the fluid 48 inside the pressure chamber 46 is pressurized. Upon reaching a desired pressure, the pressurized fluid 48 exits the pressure chamber 46 (e.g., via a second check valve 78 of the first end cap 58).

During operation of the high-pressure system 40 the reciprocating plunger 70 may translate relative to the second end cap 60 (e.g., along the axis 17 and through a bore hole 80 that extends through the second end cap 60). The dynamic seal 54 prevents passage of the pressurized fluid 48 out of the pressure chamber 46 along two paths: a first fluid path (represented by arrow 82) that passes between the pressure vessel 42 and the second end cap 60; and a second fluid path (represented by arrows 84) that pass between the second end cap 60 and the reciprocating plunger 70.

Referring to FIGS. 4 and 5, the fluid-tight seal 61 of the static seal 52 may be formed between components of the static seal 52 (e.g., the pressure vessel 42 and the first end cap 58) at a location, referred to herein as a sealing interface. As shown, the sealing interface may be formed where the components of the static seal 52 abut one another (i.e., at the location of the fluid-tight seal 61).

The abutting components may have different rates of thermal expansion and contraction, which results in the location of the sealing interface and the fluid-tight seal 61 changing as the temperature of the abutting components changes. For example, when both of the abutting components are at a lower temperature, the sealing interface of the static seal 52 may be formed at a first location 86, and when both of the abutting components are at an eccentric temperature, the sealing interface of the static seal 52 may be formed at a second location 88 that is different than (i.e., discrete with respect to or spaced apart from) the first location 86.

Eccentric temperatures (also referred to as extreme and/or unconventional temperatures) include elevated temperatures (e.g., above room temperature), reduced temperatures (e.g., below room temperature), or both elevated and reduced temperatures. According to one embodiment, elevated temperatures range from between about 50° F. to about 1000° F., for example between about 90° F. and about 1000° F., or between about 100° F. and about 1000° F. According to one embodiment, reduced temperatures range from between about −350° F. to about 40° F., for example between about −350° F. to about 32° F., or between about −350° F. to about 0° F.

The high-pressure system 40 may include components that change the temperature of the fluid 48 such that the temperature of the fluid enters the eccentric temperature range. For example, the high-pressure system 40 may include a heater that heats the fluid 48 to reach the elevated temperature range, a chiller that cools the fluid 48 to reach the reduced temperature range, or both a heater and a chiller.

During operation of the high-pressure system 40, the location of the sealing interface and the fluid-tight seal 61 may move as the high-pressure system 40 cycles thermally. It will be appreciated that the relative movement of the abutting components (e.g., due to thermal expansion and contraction, pressure changes, etc.) is "micro" movement and distinguished from "macro" movement (e.g., translation of the reciprocating plunger 70 through the second end cap 60).

As described above, mismatched thermal expansion/contraction rates of materials may alter the relative geometries of abutting components in known high-pressure systems, resulting in gaps and relative motion between abutting components. Embodiments of the static seal 52 described herein promote continuous contact with no/minimal gaps between the abutting components of the static seal 52 and enable relative motion between the abutting components that prolongs operational lifetime of the static seal 52 compared to known systems.

According to one embodiment, the static seal 52 may be formed such that the abutting components (e.g., the pressure vessel 42 and the first end cap 58) roll relative to one another (as opposed to sliding) when the sealing interface and the fluid-tight seal 61 moves (e.g., during thermal expansion/contraction of the abutting components). This rolling motion reduces fretting wear of the abutting components compared to a typical sliding motion.

According to one embodiment, assembly of the static seal 52 may include selecting material(s) for the abutting components (e.g., the abutting surfaces that form the sealing interface). A category or subset of materials may be selected based on an expected range of operating pressures for the high-pressure system 40. Then one or more specific materials or types of materials may be selected from the category or subset of materials to optimize or enhance the benefit of rolling contact between the abutting surfaces.

For example, the category or subset of materials may be high strength materials if the expected range of operating pressures is relatively high, (e.g., about 50,000 psi or above). According to one embodiment, the selected material may include 15-5 PH H900, or a material with a yield strength of at least 140,000 psi to about 190,000 psi. At lower pressures, the category or subset of materials may include medium or low strength materials (e.g., 15-5 PH H900 with a different heat treatment, 17-4 PH. The specific material(s)/type(s) of material(s) for the abutting components may be metallic.

Additionally, the rolling motion may eliminate gaps between the abutting components that may form during, and persist after, typical sliding motion of the abutting components in a known system. Some known systems form the sealing interface between two conical surfaces, forming a straight-on-straight (i.e., a flat-on-flat) cross-section, which results in sliding motion between the abutting components. Embodiments of the static seal 52 of the high-pressure system 40, on the other hand, form the sealing interface between surfaces that roll instead of slide.

For example, one or both of the surfaces of the abutting components that form the sealing interface may be curved (e.g., concave or convex, with a constant or varying radius of curvature) forming a curve on straight cross-section or a curve-on-curve cross-section. As used herein, a straight cross-section refers to a flat surface, substantially flat surface, and/or surfaces with an infinite radius of curvature as seen within the cross-section. As the abutting components expand, contract, vibrate the abutting surfaces of the abutting components that form the sealing interface and the fluid-tight seal 61 may tend to roll relative to one another at the point/line of contact instead of slide.

Although the static seal 52 is shown in the illustrated embodiment with the pressure vessel 42 including the straight abutting surface of the sealing interface and the first end cap 58 including the curved abutting surface of the sealing interface, in another embodiment the straight and curved surfaces may be reversed (i.e., the pressure vessel 42 including the curved abutting surface of the sealing interface and the first end cap 58 including the straight abutting surface of the sealing interface).

Figure 7:
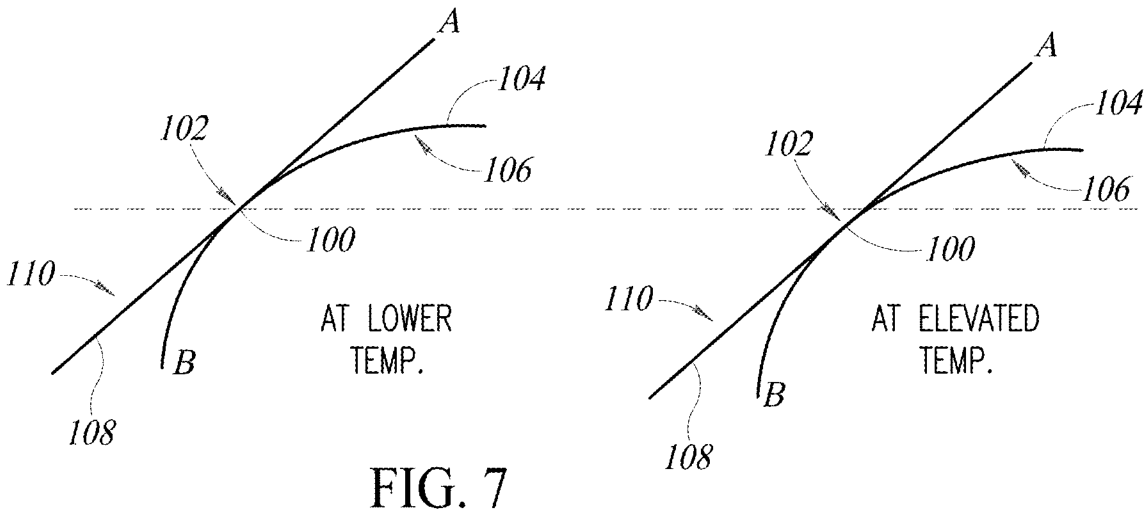
FIG. 7 is a schematic view of straight and curved abutting surfaces of adjacent components forming a sealing interface that moves as the adjacent components transition from a first temperature to a second temperature, according to one embodiment.

Referring to FIGS. 5 and 7 to 9, multiple embodiments of a sealing interface 100 (e.g., for the static seal 52) may result in rolling motion between the abutting surfaces when approaching/retreating from eccentric temperatures, which causes the abutting components to expand/contract and/or changes their shapes/geometries. As shown in FIG. 7, the sealing interface 100 may include a curve on straight interface 102. The curve on straight interface 102 may include a first abutting surface 104 of a first abutting component 106 (e.g., one of a vessel body, such as the vessel body 44, and an end cap, such as the first end cap 58) that is straight in cross-section (e.g., a conical frustrum, or cylinder in three dimensions) in direct contact with a second abutting surface 108 of a second abutting component 110 (e.g., the other of the vessel body and the end cap) that is curved in cross-section (e.g., a spherical or non-spherical frustrum in three dimensions).

Figure 8:
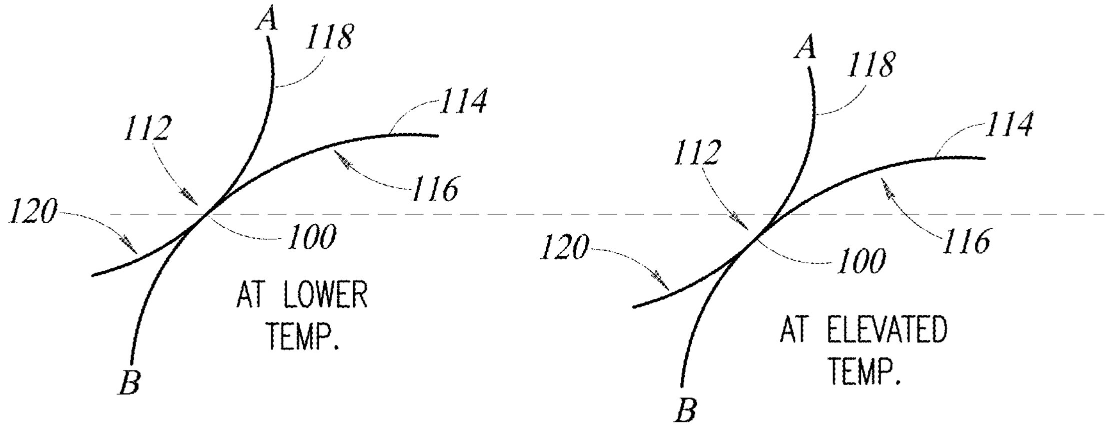
FIG. 8 is a schematic view of convex curved abutting surfaces of adjacent components forming a sealing interface that moves as the adjacent components transition from a first temperature to a second temperature, according to one embodiment.

As shown in FIG. 8, the sealing interface 100 may include a convex curve on convex curve interface 112. The convex curve on convex curve interface 112 may include a first abutting surface 114 of a first abutting component 116 (e.g., one of a vessel body, such as the vessel body 44, and an end cap, such as the first end cap 58) that is curved in cross-section (a spherical or non-spherical frustrum in three dimensions) in direct contact with a second abutting surface 118 of a second abutting component 120 (e.g., the other of the vessel body and the end cap) that is also curved in cross-section. The two curvatures may be the same or different (e.g., having different radii of curvature).

Figure 9:
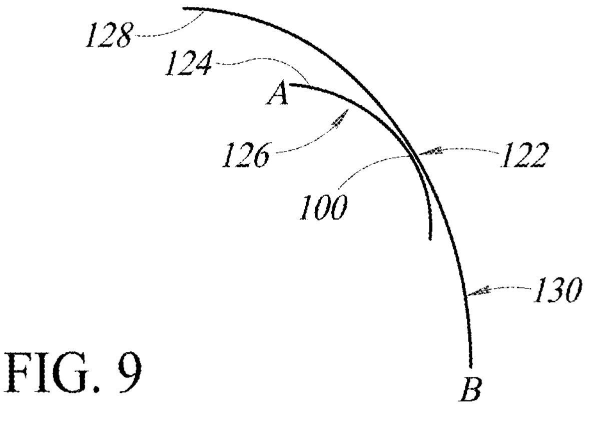
FIG. 9 is a schematic view of convex and concave curved abutting surfaces of adjacent components forming a sealing interface that moves as the adjacent components transition from a first temperature to a second temperature, according to one embodiment.

As shown in FIG. 9, the sealing interface 100 may include a convex curve on concave curve interface 122. The convex curve on concave curve interface 122 may include a first abutting surface 124 of a first abutting component 126 (e.g., one of a vessel body, such as the vessel body 44, and an end cap, such as the first end cap 58) that is curved in cross-section (a spherical or non-spherical frustrum in three dimensions) in direct contact with a second abutting surface 128 of a second abutting component 130 (e.g., the other of the vessel body and the end cap) that is also curved in cross-section. The two curvatures may be the same or different (e.g., having different radii of curvature).

Figure 1:
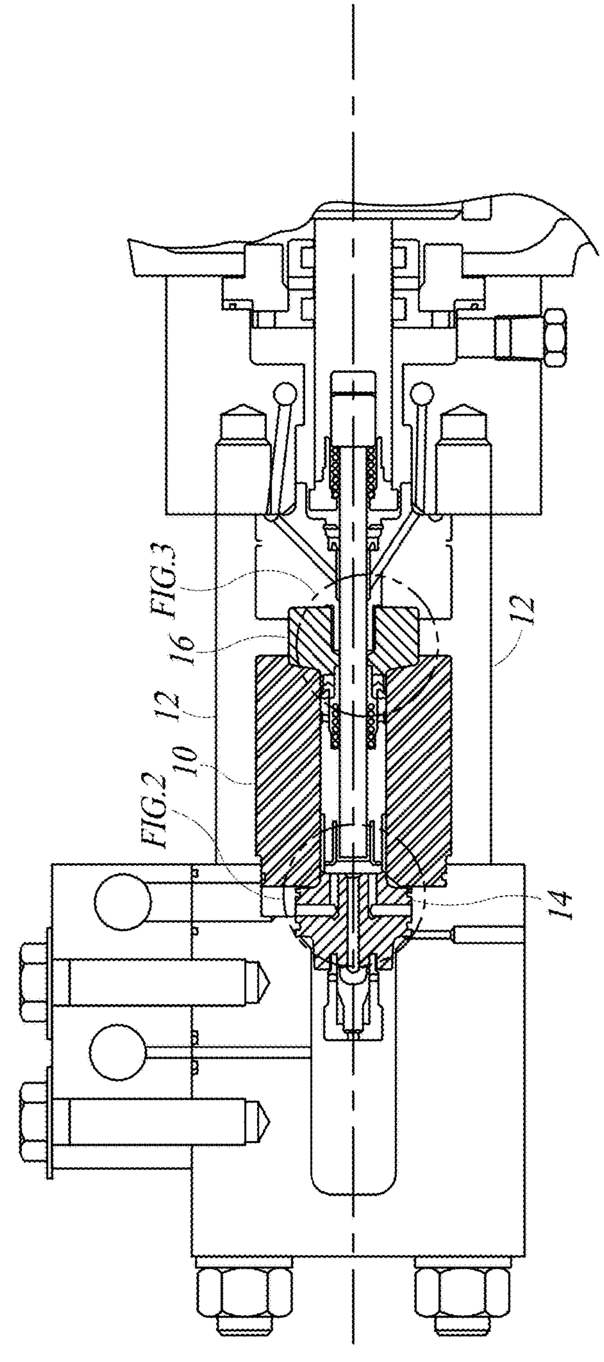
FIG. 1 (PRIOR ART)
FIG. 1 is cross-sectional side view of a known high-pressure system.

According to one embodiment, an initial load may be applied to the static seal 52 (e.g., via tie-rods 12 as shown in FIG. 1). Application of the initial load at ambient temperature conditions may enable alteration of mechanical stresses at eccentric temperatures that produce rolling movement of the abutting components. Additionally, application of the initial load (i.e., pre-stressing) may improve the performance of the static seal 52 in terms of maintaining contact at the sealing interface 100 and maintaining no/minimal gaps when the high-pressure system 40 is pressurized to the operating pressure.

Figure 10:
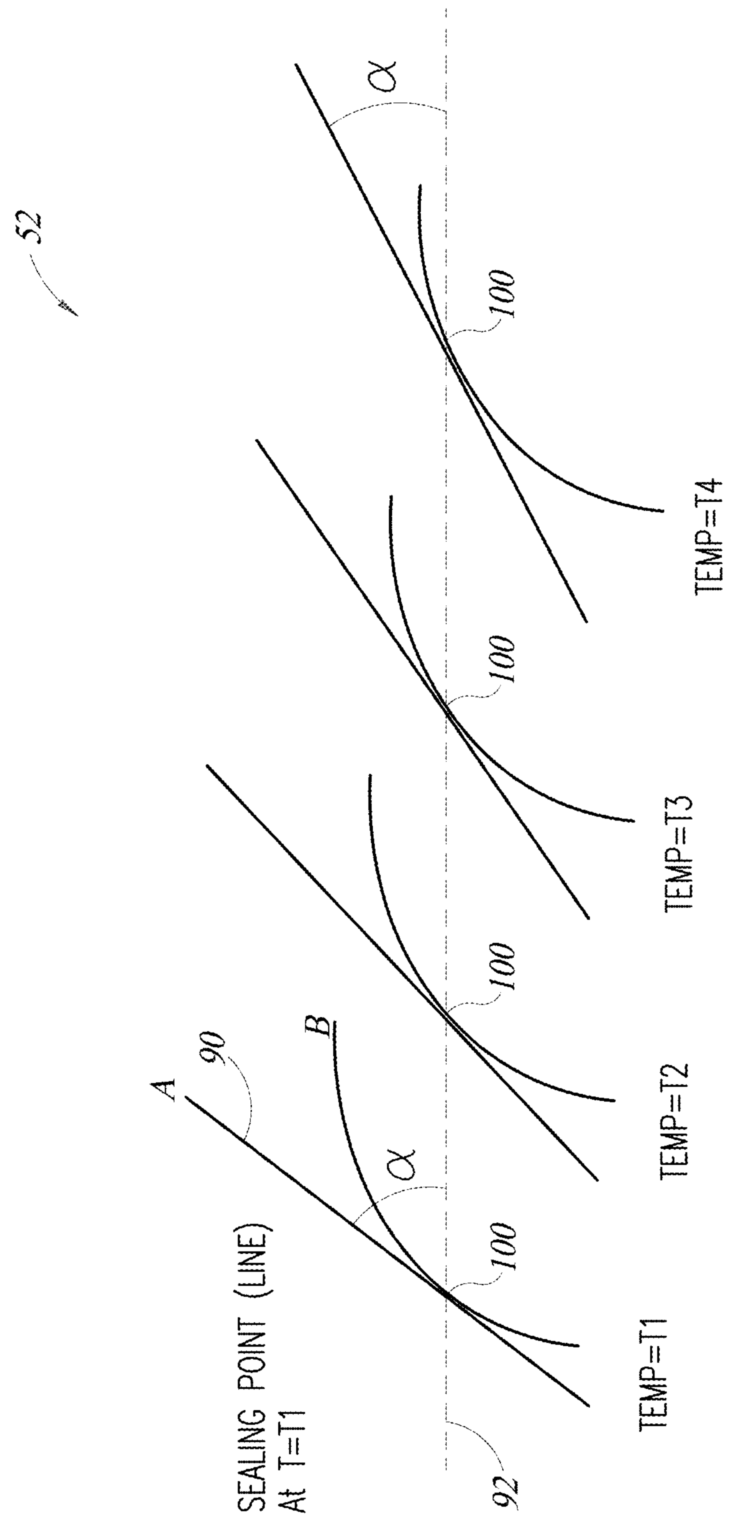
FIG. 10 is a schematic view of straight and curved abutting surfaces of adjacent components forming a sealing interface with a contact angle that changes as the adjacent components transition from a first temperature to a second temperature, according to one embodiment.

Referring to FIG. 10, assembly of the static seal 52 may include selecting a contact angle $\alpha$ between the abutting surfaces based on a range of operating temperatures. The contact angle $\alpha$ may be measured between a tangent line 90 and an axis 92. According to one embodiment, the tangent line 90 intersects the sealing interface 100 and is tangent to at least one of the curved surfaces of the abutting components, and the axis 92 may be parallel to the axis 17 (or a direction of travel of the reciprocating plunger 70).

In a curve on straight embodiment, the tangent line 90 may be coincident with the straight abutting surface that forms the sealing interface (e.g., such that the contact angle α is measured from the straight abutting surface to the axis 92). For example, the sealing interface may be formed with a contact angle α of around 65° for an expected temperature range (e.g., of the working/pressurized fluid) of 89° F. to 400° F. According to one embodiment, the contact angle α may be selected based on the material(s) selected (e.g., as described above based on the expected pressure range).

As shown in the illustrated embodiment, different contact angles α may be selected for abutting surfaces with the same geometry to produce a static seal with the desired result based on the operating temperature. For example, if the desired contact angle α at the expected eccentric temperature is 68°, then the contact angle α of the static seal 52 at lower (e.g., room) temperature will be selected such that the desired, eccentric temperature contact angle α will be achieved at the eccentric temperature.

Figure 11:
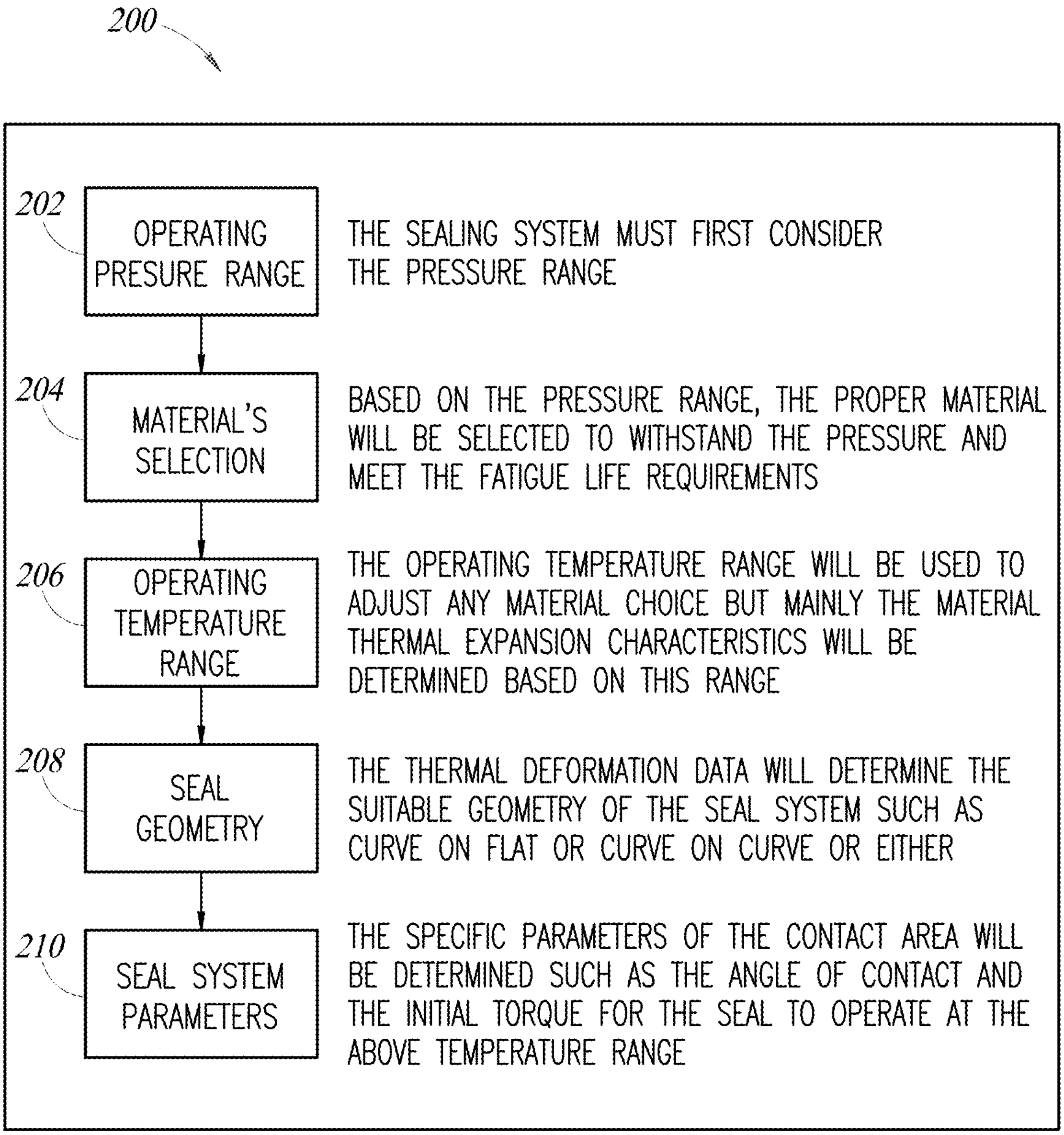
FIG. 11 is a flow diagram illustrating a method of assembly of a high-pressure fluid system that pressurizes fluids at eccentric temperatures to high pressures, according to one embodiment.

Referring to FIG. 11 a method 200 of design and/or assembly of a static seal 52 (e.g., of the high-pressure system 40) may include, at 202, determining (e.g., calculating, selecting, etc.) an operating pressure/pressure range for a high-pressure system (e.g., the high-pressure system 40) that includes the static seal 52. At 204, the method 200 may include selecting a category or first subset of materials for components of the static seal 52 that will abut to form the sealing assembly that are capable of withstanding the determined operating pressure/pressure range, and that meet fatigue life requirements (e.g., several million cycles). The fatigue strength of a material may be affected by heat treatment. When manufacturing components of the static seal 52, cracks and stress concentration sites (e.g., sharp corners) may be avoided to improve performance.

The method 200 may further include, at 206, determining (e.g., calculating, selecting, etc.) an operating temperature/temperature range for the high-pressure system that includes the static seal 52. Upon determining the operating temperature/temperature range, the method 200 may include selecting a subcategory or second subset of materials for components of the static seal 52 that will abut to form the sealing assembly that are capable of withstanding the determined operating temperature/temperature range. According to one embodiment, selecting the subcategory or second subset of materials may include removing/excluding materials from the category or first subset.

At 208, the method 200 may include determining (e.g., calculating, selecting, etc.) an acceptable geometry for the sealing interface (e.g., curve on straight, curve on curve, or either). More than one geometry may be acceptable, and, in this case, other considerations may be taken into consideration (e.g., space/size available, cost, etc.). Then, at 210, the method 200 may include determining (e.g., calculating, selecting, etc.) specific parameters of the sealing assembly. The specific parameters may include the contact angle α, initial torque applied to fasteners (e.g., tie-rods) that exert a force on the pressure vessel 42 and the first and second end caps 58, 60. According to one embodiment, the specific parameters may include surface finish (e.g., smooth, not rough). The sealing interface may be formed by surfaces with the same finish to improve performance.

According to one embodiment, determining the acceptable seal geometry may include reducing or increasing the thickness of one or more portions of one or both of the abutting components to improve heat distribution. These reductions and/or increases in thickness may be selected so as to avoid compromising the component's performance in forming the seal interface at the operating pressure/pressure range. Passages may be formed within the abutting component(s) to control deformation due to thermal expansion/contraction in favorable directions.

Figure 12:
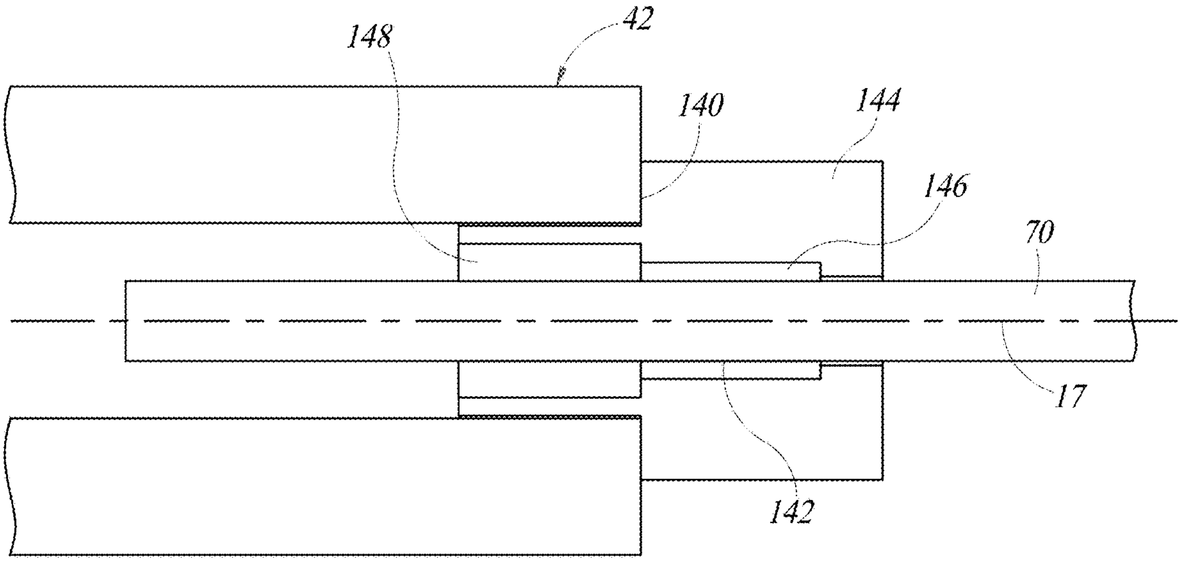
FIG. 12 is a cross-sectional side view of a dynamic seal of the high-pressure system illustrated in FIG. 4, according to one embodiment.
Figure 13:
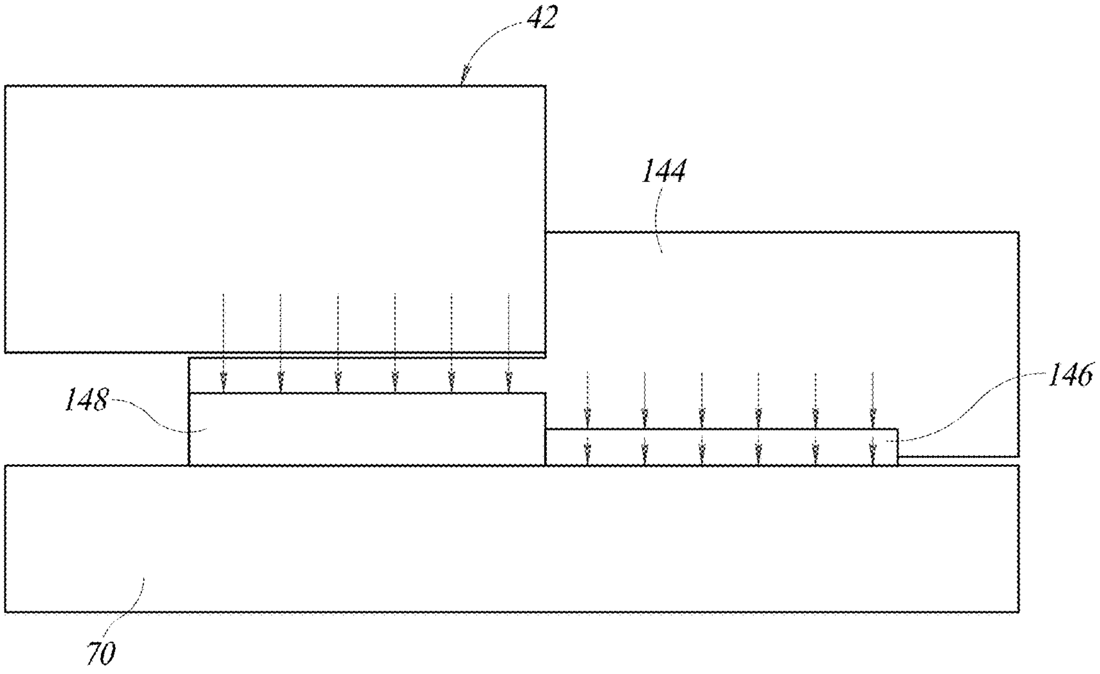
FIG. 13 is an enlarged view of a portion of the dynamic seal illustrated in FIG. 12, according to one embodiment.
Figure 14:
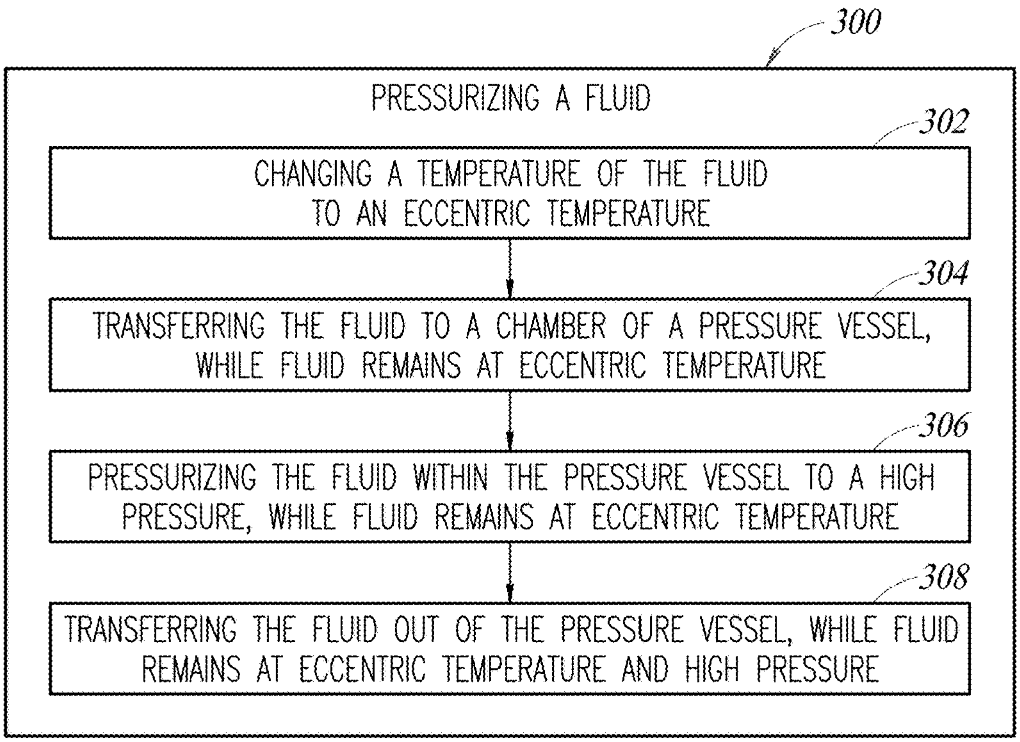
FIG. 14 is a flow diagram illustrating a method of pressurizing a fluid at an eccentric temperature, according to one embodiment.
Figure 15:
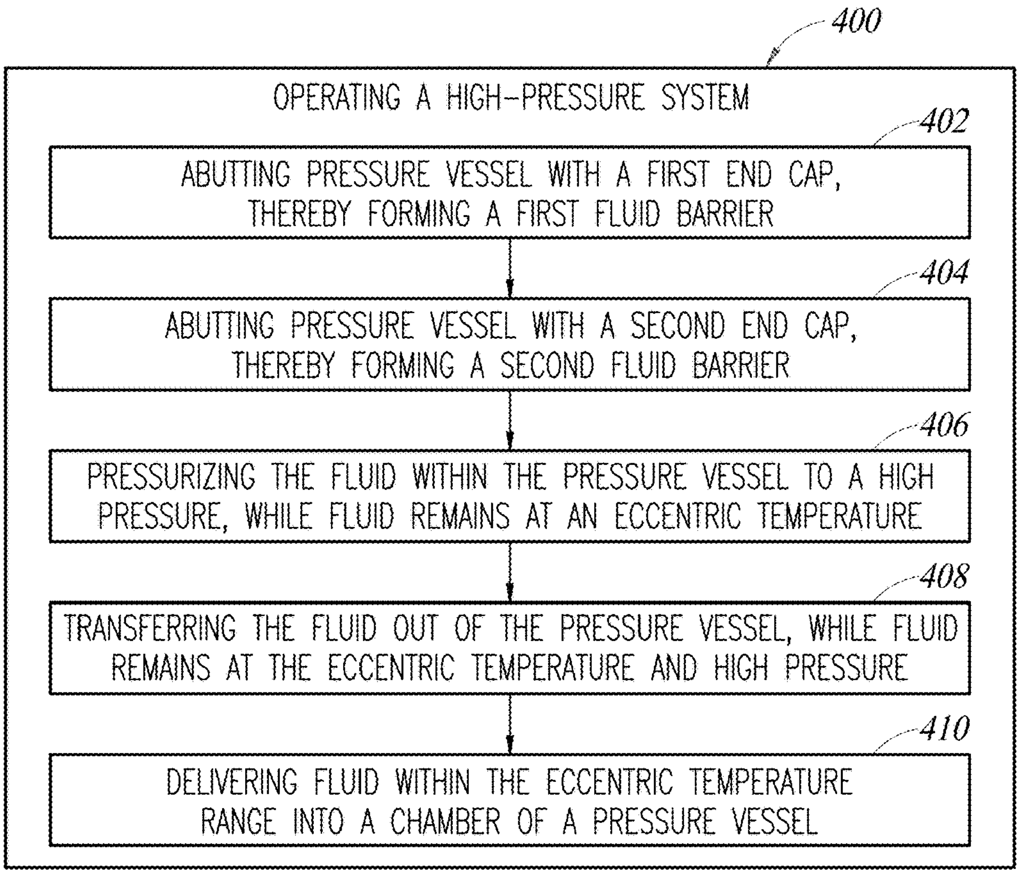
FIG. 15 is a flow diagram illustrating a method of operation of a high-pressure system, according to one embodiment.

Referring to FIGS. 6, 12, and 13, an embodiment of the dynamic seal 54 of the high-pressure system 40 may include both a static seal portion 140 and a dynamic seal portion 142. The static seal portion 140 may include a first sealing interface 143 formed between stationary, abutting components (e.g., the pressure vessel 42 and the second end cap 60). Accordingly, the static seal portion 140 of the dynamic seal 54 may be similar to the static seal 52 such that any of the description herein of the static seal 52 is equally applicable to the static seal portion 140. For example, the location of the first sealing interface 143 may change as the temperature of the abutting components changes (e.g., when both of the abutting components are at a lower temperature, the first sealing interface 143 may be formed at a first location 145, and when both of the abutting components are at an eccentric temperature, the first sealing interface 143 may be formed at a second location 147 that is different than the first location 145).

The dynamic seal portion 142 may include a second sealing interface 150 formed between moving, abutting components (e.g., the reciprocating plunger 70 and the second end cap 60). As shown, the second end cap 60 may include a seal carrier 144 that forms the first sealing interface 143 for the static seal portion 140 by abutting the pressure vessel 42. The second end cap 60 may further include a bearing 146 positioned within the bore hole 80 of the second end cap 60 between the seal carrier 144 and the reciprocating plunger 70.

According to one embodiment, the reciprocating plunger 70, the seal carrier 144, and the bearing 146 may have different rates of thermal expansion and contraction, which results formation of gaps (e.g., a first gap 152 between the reciprocating plunger 70 and the bearing 146, and/or a second gap 154 between the seal carrier 144 and the bearing 146). As the temperature of these components changes, (e.g., during operation of the high-pressure system 40 with the fluid 48 at an eccentric temperature) the size of the gaps may also change. The dynamic seal 54 (e.g., the dynamic seal portion 142) may include a seal member 148 positioned to seal the first and second gaps 152, 154 (i.e., limit and/or prevent passage of the fluid 48 through the gaps).

Previously, the use of seal members between/adjacent moving parts of a dynamic seal was avoided when using fluids at eccentric temperatures. The seal members are typically made of "softer" materials (e.g., polymers) relative to the "harder" (e.g., metallic) components used for the reciprocating plunger 70, the seal carrier 144, and the bearing 146. According to one embodiment, the bearing 146 may be made from a copper-based alloy. The "softer" materials of the seal members tend to soften even more at eccentric temperatures, which resulted in known seal members extruding/flowing into gaps between components of dynamic seals. These extruded seal members often wedge the gaps open, which encourages fluid flow through the gaps, and accelerated failure of the dynamic seal. Additionally, known seal members that are extruded into a gap may get stuck as the gap closes during a cooling cycle.

The dynamic seal 54 negates the problems presented by different rates of thermal expansion and contraction between the reciprocating plunger 70, the seal carrier 144, and the bearing 146 by providing components with shapes that generate and exert forces that promote contact between the abutting components throughout a thermal cycle, thereby limiting/preventing the formation of gaps large enough for the seal member 148 to extrude/flow through.

As shown in FIG. 6, the dynamic seal 54 (e.g., the dynamic seal portion 142) may include an o-ring 156 positioned between the seal member 148 and the seal carrier 144 (e.g., radially with respect to the axis 17). The o-ring 156 may be formed of a material that is softer than that of the seal member 148, so that the o-ring forms an initial seal at lower pressures (e.g., ambient pressures and/or those encountered during system start-up) that limits/prevents the fluid 48 from passing through the first and second gaps 152, 154.

According to one embodiment, the bearing 146 is sized and shaped to form a minimal gap (i.e., a "zero gap") between the bearing 146 and the reciprocating plunger 70 when the components are exposed to eccentric temperatures, while also exerting a minimal clamping force on the reciprocating plunger 70. For example, the radial thickness of the bearing 146 may be selected to allow controlled, predominantly radial, deformation (e.g., thermal expansion and/or contraction) that is uniform along the length of the bearing 146.

Similarly, the seal carrier 144 may be configured (e.g., made of a material, of a size and/or shape, etc.) such that at least a portion of the seal carrier 144 (e.g., a portion 158 that is positioned within the pressure chamber 46) expands and contracts at eccentric temperatures and exerts a radial force on the seal member 148 maintaining contact between the seal member 148 and the reciprocating plunger 70.

According to one embodiment, the differences in the thermal characteristics of the components of the dynamic seal 54 may be selected to achieve the minimal/zero gap. For example, the seal carrier 144 may be made of from a less conductive material with a much lower thermal expansion coefficient (e.g., stainless steel) than the material used in construction of the bearing 146 (e.g., a copper-based alloy such as Bronze). This combination of materials may prevent gap formation between the bearing 146 and the reciprocating plunger 70.

The thickness of the seal carrier 144 may be selected to control the thermal gradient of the seal carrier 144 and deformation of the bearing 146. According to one embodiment, the portion 158 of the seal carrier 144 may have a uniform thickness, a slightly varying thickness, or another cross-sectional shape that fits inside the pressure chamber 46 and applies a uniform load along the length of the seal member 148 to promote even contact between the seal member 148 and the reciprocating plunger 70.

Referring to FIGS. 4 to 6 and 14, a method 300 of pressurizing a fluid (e.g., the fluid 48) may include, at 302, changing a temperature (e.g., heating or cooling) the fluid to an eccentric temperature (e.g., between −350° F. and 32° F. or between 90° F. and 1,000° F.). At 304, the method 300 may include transferring the fluid, while maintaining the fluid at the eccentric temperature, into a pressure chamber of a pressure vessel (e.g., the pressure chamber 46 of the pressure vessel 42). At 306, the fluid may be pressurized within the pressure chamber, while maintaining the fluid at the eccentric temperature, to a high pressure (e.g., between 15,000 psi and 200,000 psi). At 308, the method 300 may include transferring the fluid out of the pressure vessel, while maintaining the fluid at the eccentric temperature and at the high pressure.

The method 300 may further include abutting the pressure vessel with an adjacent component (e.g., the first end cap 58) that is stationary with respect to the pressure vessel, thereby forming a fluid-tight barrier (e.g., the fluid-tight barrier 61) that is positioned to block passage of the fluid within the pressure chamber between the pressure vessel and the adjacent component. The method 300 may include thermally expanding one or both of the pressure vessel and the adjacent component, thereby moving the fluid tight barrier from a first location to a second location. The method 300 may further include rolling the surface of the pressure vessel along the surface of the adjacent component, thereby moving the fluid tight barrier from the first location to the second location.

According to one embodiment, the method 300 may include changing a contact angle (e.g., the contact angle α). The pressure vessel may be abutted with a second adjacent component (e.g., the second end cap 60) that is stationary with respect to the pressure vessel, thereby forming a second fluid tight barrier that is positioned to block passage of the fluid within the pressure chamber between the pressure vessel and the second adjacent component, as part of the method 300.

A plunger (e.g., the reciprocating plunger 70) may be translated through a bore hole (e.g., the bore hole 80), into the pressure chamber, and toward the first adjacent component, thereby pressurizing the fluid to the high pressure. The method 300 may include thermally expanding one or both of a seal carrier and a bearing (e.g., the seal carrier 144 and the bearing 146), thereby: reducing a size of a first gap between the seal carrier and the bearing and reducing a size of a second gap between the bearing and the plunger.

Referring to FIGS. 4 to 6 and 15, a method of operating of a high-pressure system 400 includes, at 402, abutting a pressure vessel (e.g., the pressure vessel 42) with a first end cap (e.g., the first end cap 58), thereby forming a first fluid tight barrier (e.g., the first fluid-tight barrier 61) at a first end of a pressure chamber that extends through the pressure vessel. At 404, the method 400 may include abutting the pressure vessel with a second end cap (e.g., the second end cap 60), thereby forming a second fluid tight barrier at a second end of the pressure chamber.

At 406, the method may include delivering a fluid (e.g., the fluid 48) that is at an eccentric temperature range (e.g., between 50° F. and 1,000° F., such as between 90° F. and 1,000° F.) into the pressure vessel, and at 408 pressurizing the fluid within the pressure chamber, while maintaining the fluid within the eccentric temperature range, to a high pressure range of between 15,000 psi and 200,000 psi.

A lower end of the eccentric temperature range may vary based on the fluid being pressurized. For example, when the fluid is water, the eccentric temperature range may be between 50° F. and 1,000° F., between 90° F. and 1,000° F., between 100° F. and 1,000° F., between 150° F. and 1,000° F., or between 200° F. and 1,000° F. When the fluid is oil, the floor (i.e., the lower end) of the eccentric temperature range may be even higher (e.g., between 250° F. and 1,000° F., between 500° F. and 1,000° F.). The method 400 may further include, at 410, transferring the fluid out of the pressure chamber, while maintaining the fluid within the eccentric temperature and within the high-pressure range.

Delivering the fluid according to the method 400 may include moving the fluid through an inlet check valve carried by the first end cap and into the pressure vessel. Transferring the fluid may include moving the fluid through an outlet check valve that is separate from and carried by the first end cap. The method 400 may include abutting a surface of the pressure vessel with a surface of the first end cap to form the first fluid tight barrier. According to the method 400, rolling at least one of the surface of the pressure vessel and the surface of the first end cap relative to the other of the surface of the pressure vessel and the surface of the first end cap, changes a location of the first fluid tight barrier.

Advancing a plunger through a bore hole extending through the second end cap, into the pressure chamber, and toward the first end cap, may pressurize the fluid to a value within the high-pressure range, according to one embodiment of the method 400. The method 400 may include thermally expanding one or both of a seal carrier (e.g., the seal carrier 144) and a bearing (e.g., the bearing 146) thereby reducing a size of a first gap between the seal carrier and the bearing and reducing a size of a second gap between the bearing and the plunger.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments.

Many of the methods described herein can be performed with variations. For example, many of the methods may include additional acts, omit some acts, and/or perform acts in a different order than as illustrated or described.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A method of pressurizing a fluid at an eccentric temperature, the method comprising:

changing a temperature of the fluid to an eccentric temperature within a range of between −350° F. and 32° F. or between 90° F. and 1,000° F.;

transferring the fluid, while maintaining the fluid at the eccentric temperature, into a pressure chamber of a pressure vessel;

pressurizing the fluid within the pressure chamber, while maintaining the fluid at the eccentric temperature, to a high pressure of between 15,000 psi and 200,000 psi; and transferring the fluid out of the pressure chamber, while maintaining the fluid at the eccentric temperature and at the high pressure.

2. The method of claim 1 wherein changing the temperature of the fluid includes heating the fluid to an elevated temperature between 90° F. and 1,000° F.

3. The method of claim 1 wherein changing the temperature of the fluid includes cooling the fluid to a reduced temperature of between 32° F. and −350° F.

4. The method of claim 1, further comprising:

abutting the pressure vessel with an adjacent component that is stationary with respect to the pressure vessel, thereby forming a fluid tight barrier that is positioned to block passage of the fluid within the pressure chamber between the pressure vessel and the adjacent component.

5. The method of claim 4 wherein the adjacent component is an end cap that blocks at least a portion of an opening of the pressure chamber.

6. The method of claim 5 wherein the end cap includes a first check valve through which the fluid is transferred into the pressure vessel.

7. The method of claim 6 wherein the end cap includes a second check valve through which the fluid is transferred out of the pressure vessel.

8. The method of claim 4, further comprising:

abutting a surface of the pressure vessel with a surface of the adjacent component to form the fluid tight barrier, wherein the surface of the pressure vessel is curved, the surface of the adjacent component is curved, or both the surface of the pressure vessel and the surface of the adjacent component are curved.

9. The method of claim 8 wherein at least one of the curved surfaces is convex.

10. The method of claim 8 wherein at least one of the curved surfaces is concave.

11. The method of claim 8, further comprising:

thermally expanding one or both of the pressure vessel and the adjacent component, thereby moving the fluid tight barrier from a first location to a second location.

12. The method of claim 11, further comprising:

rolling the surface of the pressure vessel along the surface of the adjacent component, thereby moving the fluid tight barrier from the first location to the second location.

13. The method of claim 12, further comprising:

rolling the surface of the adjacent component along the surface of the pressure vessel, thereby moving the fluid tight barrier from the first location to the second location.

14. The method of claim 8, further comprising:

changing a contact angle measured between a tangent line that intersects the fluid tight barrier and is tangent to at least one of the curved surfaces and an axis of elongation of the pressure vessel.

15. The method of claim 4 wherein the adjacent component is a first adjacent component, and the fluid tight barrier is a first fluid tight barrier, the method further comprising:

abutting the pressure vessel with a second adjacent component that is stationary with respect to the pressure vessel, thereby forming a second fluid tight barrier that is positioned to block passage of the fluid within the pressure chamber between the pressure vessel and the second adjacent component.

16. The method of claim 15 wherein the second adjacent component is an end cap with a bore hole extending therethrough, the method further comprising:

advancing a plunger through the bore hole, into the pressure chamber, and toward the first adjacent component, thereby pressurizing the fluid to the high pressure.

17. The method of claim 16 wherein the second adjacent component includes a seal carrier that forms the bore hole, and a bearing, the method further comprising:

positioning the bearing within the bore hole such that the bearing is between the seal carrier and the plunger; and thermally expanding one or both of the seal carrier and the bearing, thereby:

reducing a size of a first gap between the seal carrier and the bearing; and reducing a size of a second gap between the bearing and the plunger.

18. The method of claim 17 wherein the seal carrier and the bearing are made from different materials such that the seal carrier and the bearing have different rates of thermal expansion.

19. The method of claim 18, further comprising:
positioning a seal member within the bore hole such that:
a first surface of the seal member abuts the plunger; and
a second surface of the seal member abuts both the seal carrier and the bearing, such that the seal member blocks both the first gap and the second gap.

* * * * *